United States Patent [19]
Cross, Jr.

[11] Patent Number: 4,943,155
[45] Date of Patent: Jul. 24, 1990

[54] COLOR PROJECTION SYSTEM WITH A COLOR CORRECTION WEDGE

[75] Inventor: Eugene W. Cross, Jr., Escondido, Calif.

[73] Assignee: Hughes Aircraft Company, Los Angeles, Calif.

[21] Appl. No.: 419,985

[22] Filed: Oct. 11, 1989

Related U.S. Application Data

[62] Division of Ser. No. 137,486, Dec. 22, 1987, Pat. No. 4,890,901.

[51] Int. Cl.$^5$ .................. G03B 21/00; G02B 5/04; G02F 1/13
[52] U.S. Cl. ................... 353/33; 350/331 R; 350/168; 350/286; 350/395
[58] Field of Search ............ 353/33; 350/331 R, 394, 350/395, 168, 286, 287, 447, 171, 169

[56] References Cited

U.S. PATENT DOCUMENTS

| | | | |
|---|---|---|---|
| 2,403,731 | 7/1946 | MacNeille | 350/171 |
| 2,792,740 | 5/1957 | Haynes | 350/171 |
| 4,343,535 | 8/1982 | Bleha | 350/342 |
| 4,514,050 | 4/1985 | Stites | 350/168 |
| 4,541,688 | 9/1985 | Watt et al. | 350/171 |
| 4,597,634 | 7/1986 | Steenblik | 350/168 |
| 4,650,286 | 3/1987 | Koda et al. | 350/342 |

*Primary Examiner*—Jon W. Henry
*Attorney, Agent, or Firm*—Joseph E. Szabo; Wanda K. Denson-Low

[57] ABSTRACT

An embedded polarizing beamsplitter employed in a liquid crystal light valve color projector introduces lateral chromatic aberration of complex distribution that degrades contrast and resolution of the projected image. Color correction is provided to substantially eliminate any noticeable lateral chromatic aberration by replacing the output window of the prism with an optical wedge made of the same material as the embedded prism plate of the beamsplitter.

3 Claims, 2 Drawing Sheets

COLOR PROJECTION SYSTEM WITH A COLOR CORRECTION WEDGE

This is a division of application Ser. No. 137,486, filed Dec. 22, 1987, now U.S. Pat. No. 4,890,901.

BACKGROUND OF THE INVENTION

1. Field of the Invention

The present invention relates to embedded prisms, and more particularly concerns correction of lateral chromatic aberration of light transmitted through such an embedded prism.

2. Description of Related Art

A type of beamsplitter widely used for selectively passing and reflecting a light beam includes a thin, flat, parallel sided, transparent plate mounted in a transparent liquid or solid medium at an angle, commonly about 45°, to the axis of a beam of light that is to be transmitted or reflected. Such beamsplitters may be polarizing or nonpolarizing. A polarizing beamsplitter, but not of the embedded type, is described in U.S. Pat. No. 2,403,731 issued to MacNeille. The polarizing beamsplitter, such as the MacNeille type polarizing beamsplitter will pass light having one polarization state, such as the "P" state for example, and reflect light with another polarization state, such as the "S" state for example. Thus, the polarizing beamsplitter selectively passes or transmits a light beam, depending upon whether the polarization vector of the light is one or the other of two mutually orthogonal directions. In the beamsplitter described in the MacNeille patent, a plurality of dielectric layers of appropriate indices of refraction and thicknesses are deposited at the interface between the two halves of a glass cube of which the mating interface extends diagonally between two diagonally opposite edges of the cube.

In an embedded MacNeille polarizing beamsplitter, a housing of generally cubic configuration is provided with transparent front, back, entrance and exit windows. This is filled with a fluid in which is suspended a prism plate comprising a thin plate with mutually parallel planar sides that extends diagonally across the cube. A plurality of thin dielectric layers, of the type described in the MacNeille patent, may be applied to the thin plate to make this embedded prism a MacNeille polarizing prism. Such embedded prisms exhibit a color defect known as lateral chromatic aberration, which significantly decreases clarity and resolution of transmitted light and also significantly reduces contrast, thereby producing an image of decreased quality. This aberration is due to the different variation of index of refraction with color from one material to another, as will be explained below.

To avoid bending of the light transmitted through the embedded prism plate, the prism and the fluid in which it is immersed are made of materials selected to have matching indices of refraction. As is well known, the index of refraction of a material is proportional to the reciprocal of the velocity of light propagated in the material, and such velocity varies from one material to another. Thus, as the light passes from one material to another with a different index of refraction, the light beam is bent. Accordingly, an embedded prism must be constructed with materials having the same index of refraction insofar as possible, if beam bending is not desired. However, the index of refraction of any given material varies non-linearly with the wavelength of the light or its color. Accordingly, when matching indices of refraction of two materials, it is common to employ the peak visual wavelength, green, which has a wavelength of about 550 nanometers ($550 \times 10^{-9}$ meters or 0.55 micrometers, which is approximately 21.7 microinches) when comparing indices of refraction. Nevertheless there exists for each material an unique, non-linear color sensitive variation (from one wavelength to another) of its index of refraction. The non-linear variation of index of refraction with color (wavelength) itself varies from one material to another, even if the indices of the two materials are the same at some given wavelength. Therefore, although two materials may be selected to have nominally equal indices of refraction, in actual fact the indices of refraction are equal only at the particular "match" wavelength.

Refraction of a component of light at an interface between two media depends upon both the difference in indices of refraction of the media and the angle of incidence of the light upon the interface. When a converging or diverging beam of light is directed at the reflection/transmission interface, generally inclined at 45° to the axis of the incident beam in a beamsplitter, the angle of incidence of different rays of the same beam on the interface varies as the distance of the point of impingement of the ray from the center line of the light beam increases.

The described lateral chromatic aberration is a color distortion that is not uniform over the field of the light beam, but generally increases with increasing distance from the optical axis. At any given distance from the optical axis, in any direction, the magnitude of this chromatic aberration is generally the same.

Past efforts to minimize adverse effects of such lateral chromatic aberration of embedded prisms have generally been directed toward selection of materials having indices of refraction that not only match at a given wavelength, such as 550 nanometers, but in which, for one material, the non-linear variation of the refracted index with color is either of a minimal value or also closely matches the non-linear variation of index of refraction of the other material. Complete and satisfactory avoidance of this problem has not been achieved in the past, even with the use of very expensive materials, such as fused silica for the prism plate and a specifically manufactured fluid, such as Cargille standard fused silica matching liquid, code 50350.

Although the embedded prism polarizing beamsplitter, e.g. an embedded MacNeille type polarizing beamsplitter, is useful in a wide variety of applications, one example of such an application is a color projection system employing a liquid crystal light valve. Examples of such projection systems are described in U.S. Pat. No. 4,343,535 to Bleha, Jr. and in U.S. Pat. No. 4,650,286 to Koda et al. A color projection system of this type is made and sold by Hughes Aircraft Company as HDP-6000 Model 700. The model 700 series of this projection system uses an embedded prism polarizing beamsplitter having a fused silica T12 OPTOSIL prism plate having an index of refraction of 1.459723 at 554.5 nanometers suspended in the Cargille code 50350 fluid. Hughes Aircraft Company HDP-6000 color projection system Models 800 and 1000 use a prism plate of Schott BK7 glass having an index of refraction of 1.518298 at 554.5 nanometers and a Cargille code 1160 fluid having an index of refraction of 1.517903 at the same wavelength. In such a color projection system, as described in detail in these patents, light from a light source is reflected from a MacNeille prism to a liquid crystal light valve which causes the light valve to retroreflect light of a particular polarization in accordance with modulation imposed on the light valve by an image generator, such as a cathode ray tube. The uniquely polarized light modulated and retroreflected from the light valve is then transmitted through the embedded MacNeille prism and projected via a projection lens. Transmission of the polarized light through the embedded MacNeille prism is subject to the above-described color aberration, despite the selection of expensive materials for the embedded MacNeille prism, whereby contrast and resolution of the resulting projected image is significantly degraded.

Accordingly, it is an object of the present invention to provide color correction for an embedded prism.

SUMMARY OF THE INVENTION

In carrying out principles of the present invention, in accordance with a preferred embodiment thereof, an embedded prism includes a prism body formed of a first material, and prism means mounted within the body-forming an interface with the body and being formed of a second material having an index of refraction substantially equal to the index of refraction of the material of the body at a selected wavelength. Light entering the prism body is transmitted to an exit area through the prism means, but is subject to color aberration. Correcting means are coupled with the prism body for correcting the transmitted light beam for the color aberration. In accordance with one specific embodiment of the invention, the correcting means comprises a correcting wedge mounted in the exit area. According to another feature of the invention, the correcting wedge is formed of a material having the same index of refraction as the index of refraction of the prism means.

DESCRIPTION OF THE PREFERRED EMBODIMENT

Figure 1:
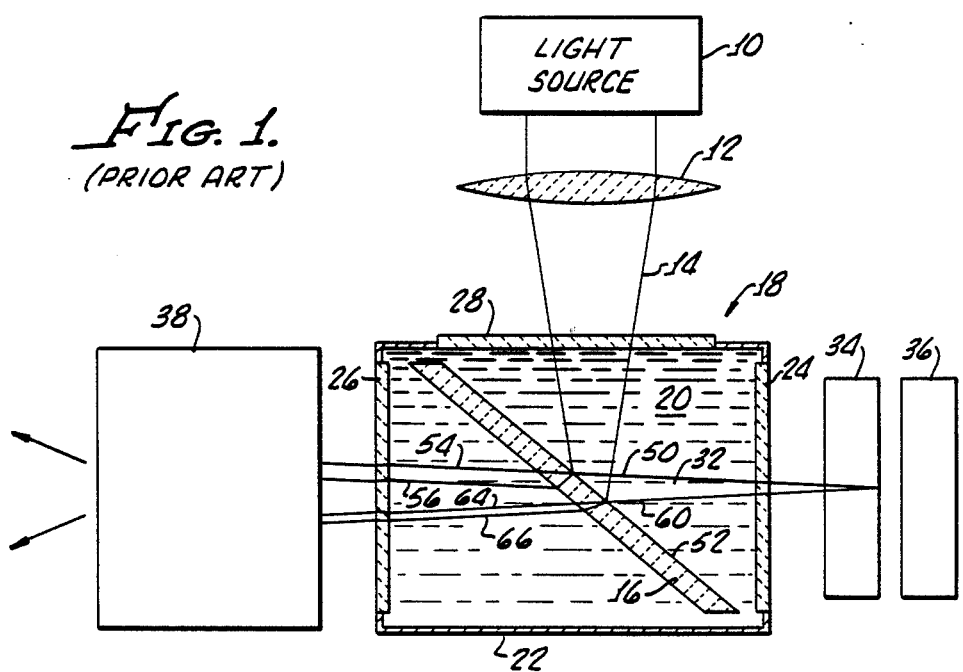
FIG. 1 illustrates a liquid crystal light valve color projector of the prior art employing a MacNeille prism without color correction.

FIG. 1 illustrates a liquid crystal light valve color projection system of the type generally shown in U.S. Pat. No. 4,343,535 to Bleha, Jr. and U.S. Pat. No. 4,650,286 to Koda et al. Briefly, this color projection system embodies a light source 10 that emits unpolarized light that is transmitted through a collimating lens 12 which directs the light beam 14 to a prism plate 16 of an embedded version 18 of a MacNeille prism. The MacNeille prism is a polarizing beamsplitter which accomplishes selective polarization, as generally described in the patent to MacNeille, 2,403,731. The embedded MacNeille-type prism 18, schematically depicted in FIG. 1, comprises a parallel flat sided transparent prism plate 16 coated with a plurality of thin, dielectric layers as described in the MacNeille patent No. 2,403,731, and suspended in a prismatic fluid 20, all carried in a fluid-tight housing generally indicated at 22, having a transparent front window 24 and a transparent exit window 26.

The polarizing beamsplitter 18 includes an input window 28 through which it receives randomly polarized light from source 10, transmits light of one polarization, such as the "P" polarization for example, and reflects light of another polarization state, such as the polarization state "S" for example.

Reflected light of "S" polarization state travels along a reflected beam 32 to a liquid crystal light valve 34 that is modulated by an image generating source, such as a cathode ray tube 36. Where the screen of the cathode ray tube 36 has no phosphor emission and is therefore dark, the corresponding area of the light valve 34 remains in an off state, and light is retroreflected from the light valve 10 back to the polarizing prism with its polarization state unchanged. Because the polarization of the light is unchanged from its original "S" state, light is again reflected from the beamsplitter prism plate and returns to the light source 10. None of this light of polarization state "S" is transmitted by the prism plate from the light valve 34 to the projection lens, and thus the corresponding areas imaged by a projection lens 38 remain dark. For those phosphor areas of the screen of the cathode ray tube 36 that are bright, some or all of the light reflected from the light valve 34 is rotated from "S" polarization state to "P" polarization state, and acquires an intensity proportional to the intensity of the light from the cathode ray tube screen. This light of polarization state "P" is retroreflected by the light valve 34 and transmitted through the polarizing beam splitter 18, passing through the beamsplitter exit window 26 and projection lens 38 to form a bright image on a projection screen (not shown).

The described projection system is subject to a problem that significantly degrades both contrast and resolution of the projected image. This error is unique to the embedded prism, and is primarily due to differences of the non-linearity of variation of index of refraction of the two adjacent materials, material of the prism plate 16 and material of the fluid 20. As previously mentioned, index of refraction of the material varies from one wavelength to another. Materials of the prism plate 16 and fluid 20 are selected to have the same index of refraction at a given wavelength, generally at the peak of the visual spectrum, or green, which has a wavelength of about 550 nanometers. Not only are the materials selected to have the same index of refraction at the visual peak, but, because the index of refraction varies with wavelength (or color), materials are chosen such that variation of the index of refraction for each with wavelength will be as close to one another as possible in the two materials. For this reason, namely to decrease lateral chromatic aberration caused by difference in non-linearities of variation of index of refraction with color of the two adjacent materials of the prism, a fused silica is commonly used for the prism plate 16, and an unique fluid, such as the Cargille code 50350, is chosen as a best match of indices of refraction over the visual spectrum. Nevertheless, despite best efforts to employ materials having matching indices of refraction, and despite the expense involved in use of relatively uncommon materials, non-linearities of the variations of the indices of refraction cannot be precisely matched so that resolution and contrast continue to be degraded.

The effect of the lateral chromatic aberration introduced by the non-matching indices of refraction is heuristically illustrated in FIG. 1, which shows a single light ray 50 transmitted from light valve 34 impinging upon the prism plate fluid interface 52 (which is inclined at an angle of 45° with respect to the optical axis of beam 32). Color components of this white light ray 50 are differently refracted, to thereby separate the color components as indicated by the red ray 54 and the blue ray 56. Similarly, a light ray 60 retroreflected from the liquid crystal light valve impinges on the interface 52 and the color components of its white light are differently refracted to provide the red ray 64 and blue ray 66. The differently diffracted color component rays 54,56, 64,66 are transmitted to the projection lens 38 to form a projected beam having significant color aberration, and therefore having significantly decreased resolution and contrast. The magnitude of the described aberration increases with increase of thickness of plate 16. Therefore, the plate 16, which must have at least a minimum thickness of 1/30th to 1/15th of its length (at least for structural and fabricational considerations), is usually made as thin as possible to decrease the color aberration. Current commercial prism plates of BK7 glass are about 0.125-inches thick (1/34th of length) and yet are about as thin as can be economically made. Plates this thin still produce unacceptably large lateral chromatic aberration at the prescribed incidence angle (54.6°).

The lateral chromatic aberration in the embedded prism as described above is primarily due to the lack of match of indices of refraction of the fluid 20 and the material of the prism plate 16. The effect is also a function of the angle of incidence, as there is infinitesimal aberration when the light beam axis is directed along a perpendicular to the interface. Moreover, the effect is more pronounced when the impinging light beam is converging or diverging. On the axis of the incident light beam the color aberration effect is relatively small, but the error increases, in a non-linear fashion, with increasing distance from the optical axis.

Figure 2:
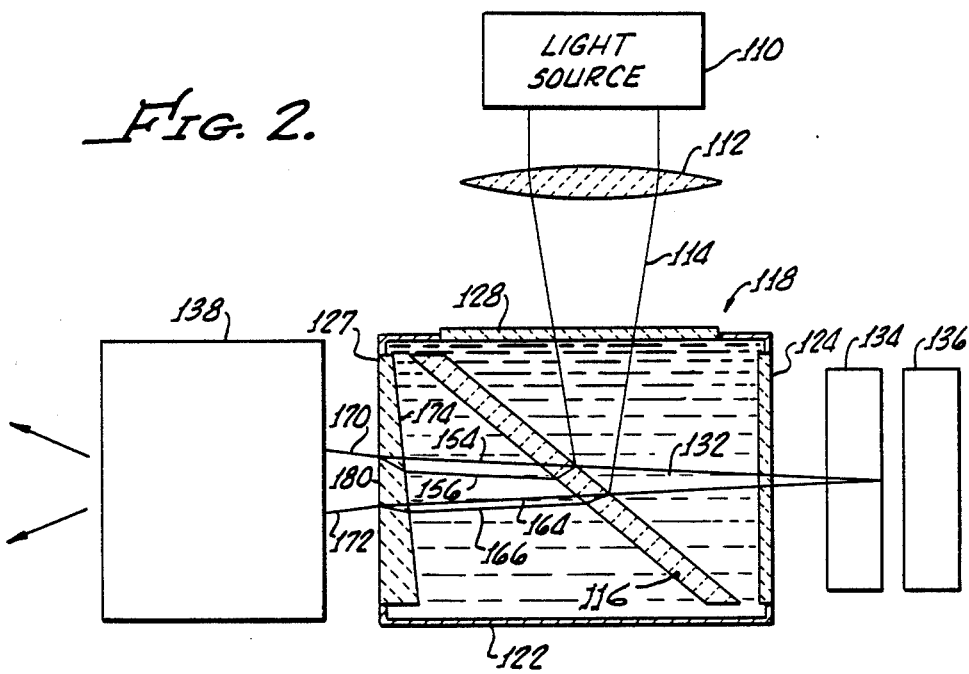
FIG. 2 illustrates a liquid crystal light valve color projector having a MacNeille prism with a color corrector exit prism.

Applicant has discovered, surprisingly and unexpectedly, that the described lateral chromatic aberration in the embedded prism can be substantially completely corrected by the substitution of a wedge for the exit window 26. One reason for surprise at the simplicity of the correction is the complexity of the aberration. The lateral chromatic aberration present is not the usual type of aberration which is radially symmetric about the optical axis. Instead, an aberration vector map sweeps out a "Lemniscate of Bernouli," or the two-leaved rose. Thus, as illustrated in FIG. 2, a liquid crystal light valve color projection system, corrected for lateral chromatic aberration introduced by the embedded polarizing prism is arranged substantially identically as the system of FIG. 1, with only the substitution of an optically transparent wedge 127 for the exit window 26. In FIG. 2, elements that are identical to comparable elements of FIG. 1 are denoted by the same reference numerals with the prefix 1. Thus, light source 10 of FIG. 1 corresponds to light source 110 of FIG. 2, and prism plate 16 of FIG. 1 corresponds to prism plate 116 of FIG. 2, etc. The system of FIG. 2 operates in the same manner as the system of FIG. 1. However, the exemplary dispersed light rays 154,156, differently refracted because of the non-matching indices of refraction of fluid 120 and prism plate 116, are recombined by wedge 127 which is positioned at the exit area of the MacNeille prism 118. This results in a single combined white ray 170 for dispersed rays 154,164 and in a single combined white ray 172 for the dispersed color component rays 156,166. It will be understood, of course, that the dispersion of the rays and the various angles illustrated in the drawings are exaggerated for purposes of illustration. Therefore, with the exit window taking the form of wedge 127, the chromatic aberration produced by the embedded prism is effectively eliminated so that contrast and resolution of the resulting projected image are significantly improved.

Material of the color correcting prism 127 is chosen to have indices of refraction for all colors as close as possible to the indices of refraction of the prism plate 116. Most conveniently this is achieved by making the color correcting wedge 127 of the same material as prism plate 116. The inwardly facing, downwardly and inwardly inclined surface 174 of wedge 127 is in contact with the fluid 120, just as are both surfaces of the prism plate 116 (or its coatings). Depending on particular materials involved, and as a specific example with materials used for the fluid 120 and prism plate 116 as described above, the angle of the wedge, that is, the inclination of inwardly facing surface 174 with respect to the opposite (external) surface 180 of the color correcting prism, is between 2° and 4°. Best results have been achieved with a wedge angle of about 3° for these materials, when the optimum angle of incidence (54.6°) for the polarizing plate has been used.

Tests of the color correction for the described color projection system have shown a dramatic improvement as compared to prior systems, which are otherwise identical except for the lack of the color correcting prism. Absence of annoying color fringes, which existed in the prior systems, produce a sense of greatly increased image quality. Tests have shown that the amount of lateral chromatic aberration existing with a polarizing beamsplitter prism 118, of the type shown in FIG. 2, having the color correction wedge 127, is so small as to be negligible. Effectively, the color correcting wedge provides a full one hundred percent correction. This is so because the residual amount of color aberration is less than the color error in the projection lens, and thus for all effective purposes the color correction is essentially perfect.

Figure 3:
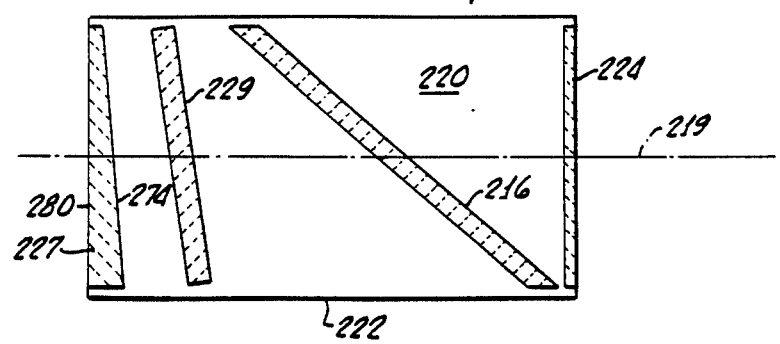
FIGS. 3, 4 and 5 illustrate respective modifications of the color corrected MacNeille prism shown in FIG. 2.

FIG. 3 illustrates a slight modification of the corrected embedded prism of FIG. 2 and shows the embedded prism 218 substantially similar to the prism 118 of FIG. 2, having a housing 222, a front window 224, and an internal fluid 220 in which is suspended a prism plate 216, the prism being provided with a color correcting prismatic exit wedge 227, all substantially the same as described in connection with FIG. 2. However, to provide a further degree of adjustment of the amount of color correction, or to provide effectively a fine tuning of the amount of color correction, a thin, transparent plate 229 having parallel flat sides and a thickness in the order of one eighth to a quarter of an inch (a thin plate) is also suspended in the fluid 220 within the housing and positioned between the correcting wedge 227 and the prism plate 216. Fine tuning plate 229 is positioned with its flat surfaces at an angle to a vertical line, as seen in FIG. 3, which may be somewhat greater or less than the angle between the inclined inner surface 274 of correcting wedge 227 and a vertical line. In the correcting wedges 127 and 227, the external surfaces 180 and 280 lie in a plane perpendicular to the optical axis, whereas the inclined front or inwardly facing surfaces 174 and 274 of each wedge extend at an angle of approximately 3° with respect to a plane that is normal to the optical axis, as previously described. The plane of the surfaces of the fine tuning plate 229 then may extend at an angle to a plane normal to the optical axis that is a degree or a fraction of a degree more or less than the angle of surface 274 of the correcting wedge. The angle of fine tuning plate 229 is determined empirically, and the material of the plate 229 is also chosen to have the same index of refraction as that of the correcting wedge and the prism plate 216. This can be most conveniently achieved by choosing the same material for fine tuning plate 229 as used for the correcting wedge 227 and for prism plate 216. Tuning plate 229 changes the effective color correction action of wedge 227.

Figure 4:
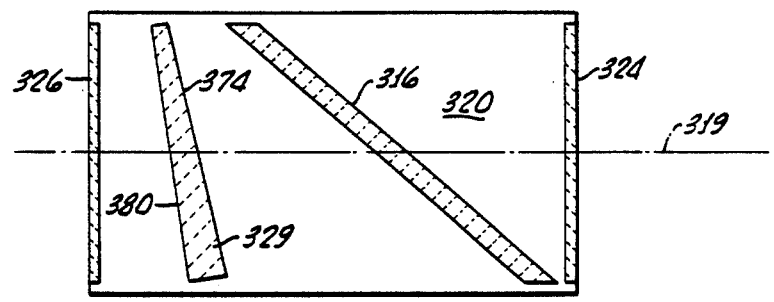

As shown in the modification of FIG. 4, a corrected embedded prism includes a prism plate 316 suspended in a fluid 320 in a housing having a front window 324 and a rear window 326, which in this case has parallel flat sides and provides no color correction. The color correcting wedge in this embodiment is positioned between the prism plate 316 and the exit area window 326. In this case the main color correction is provided by selection of the wedge angle of correcting wedge 329, and the fine tuning is effected by selecting the angle of tilt of the wedge 329 with respect to the optical axis 319. Thus, the correcting wedge 329 has a rear surface 380 that is inclined with respect to a plane perpendicular to optical axis 319, and, moreover, has a forwardly facing wedge surface 374 that extends at a selected angle, such as the above-described 3° with respect to the plane of the surface 380.

Figure 5:
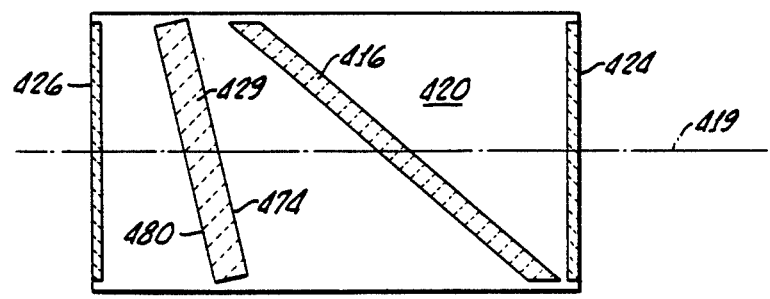

In the arrangement of FIG. 5, an embedded prism includes a fluid 420 in which is suspended a prism plate 416, all mounted in a housing 422, having a front window 424 and a rear, flat, parallel sided window 426. Color correction in this arrangement is provided by suspending within the fluid 420 a thick plate 429 having flat, parallel sides 480, 474. In the arrangement of FIG. 5, correction is provided by the parallel sided correcting plate 429 because of its thickness and the angle of its faces relative to the optical axis 419. The use of a thick plate, which is herein defined as a plate having a thickness of between about one quarter and one inch, achieves a correcting effect equivalent to the exit wedge 127 of FIG. 2 when suspended within the fluid 420 and tilted at an appropriate angle, such as an angle of between 2° and 4°, for example. It may be noted that the beam transmitted through the embedded prisms of FIGS. 2, 3, 4 and 5 is not bent, because the index of refraction of the prism plate matches that of the embedded fluid at a selected wavelength.

Although the arrangements illustrated in FIGS. 2 through 5 all show the correcting elements in contact with a fluid having an index of refraction that matches, at least at one wavelength, the index of refraction of the correcting element, the principles of the invention are applicable to use of a correcting wedge that is positioned outside of the polarizing beamsplitter prism or other embedded prism. In such an arrangement, the embedded prism would take the configuration of the prior art prism illustrated in FIG. 1, having a parallel, flat sided exit window 26. In this case the wedge, such as a wedge 127, would be mounted outside of the embedded prism between the prism and the projection lens 138. In such an arrangement, the color correction would be achieved in the manner and to the extent previously described in connection with FIG. 2. However, because of the mismatch of impedance between the color correcting wedge and the air in which this correcting prism is now immersed in such a configuration, the optical beam is bent by the correcting wedge. If such beam bending can be tolerated or corrected, the correcting wedge need not be mounted in contact with the index matching fluid of the beamsplitter prism.

Although the embedded prism shown in FIG. 2 employs an index matching fluid, the prism may also be made with a solid body in which is embedded a solid, flat, parallel sided prism plate, like plate 116 of FIG. 2. This plate may be adhesively secured to the solid, transparent material in which it is embedded. If the prism plate is made of a material other than that of the embedding solid, the system will exhibit the described lateral chromatic aberration, which may be corrected by adhesively securing a color correcting wedge at the prism exit area.

Although the invention has been described herein in connection with use in a polarizing beamsplitter prism forming part of a liquid crystal light valve color projection system, it will be readily appreciated that the principles of the invention are applicable to other types of embedded prisms, whether liquid or solid, whether polarizing or non-polarizing. For example, principles of the invention are applicable for color correction of aberrations exhibited in multi-color laser systems, where multiple colors are made colinear, co-planar, or parfocal. Thus, it will be seen that instead of requiring very costly materials for use as components of liquid prisms and other embedded prisms, and instead of attempting to minimize thickness of the prism, all without obtaining satisfactory results, the lateral chromatic aberration can be readily corrected by use of a simple and inexpensive correcting wedge or tilted plate. Application of principles of the invention therefore result not only in cost savings, but in significant improvement in projected image quality.

Although the foregoing has been a description and illustration of specific embodiments of the invention, various modifications and changes thereto can be made by persons skilled in the art without departing from the scope and spirit of the invention as defined by the following claims.

What is claimed is:

1. A color projection system comprising:
    a light source,
    a projection lens,
    a liquid crystal light valve,
    an image generator for modulating light transmitted to said liquid crystal light valve,
    polarizing beamsplitter means interposed between said light source and said liquid crystal light valve and between said light valve and said projection lens for reflecting light from said light source to said liquid crystal light valve and for transmitting light reflected from said valve to said projection lens,
    said polarizing beamsplitter means having an optical axis and comprising
        a prism body of a fluid having a first index of refraction at a selected wavelength,
        a parallel sided transparent plate suspended within said fluid for reflecting light from said light source to said light valve and for transmitting light from said light valve to said projection lens, said plate being formed of a solid material having a second index of refraction substantially equal to said first index of refraction at said selected wavelength, whereby light transmitted through said plate is subject to a complex lateral chromatic aberration that increases with increasing distance from the optical axis, and a color correction wedge interposed between said plate and said projection lens in contact with said fluid for correcting light transmitted through said plate for said lateral chromatic aberration, said wedge being formed of a material having the same index of refraction as said plate over a band of wavelengths.

2. The color projection system of claim 1 wherein said wedge has a first face normal to said axis and a second face extending at an angle relative to said first face of between about 2° and 4°.

3. The color projection system of claim 2 wherein said wedge is formed of the same material as the material of said plate.

* * * * *